UNITED STATES PATENT OFFICE 2,613,180

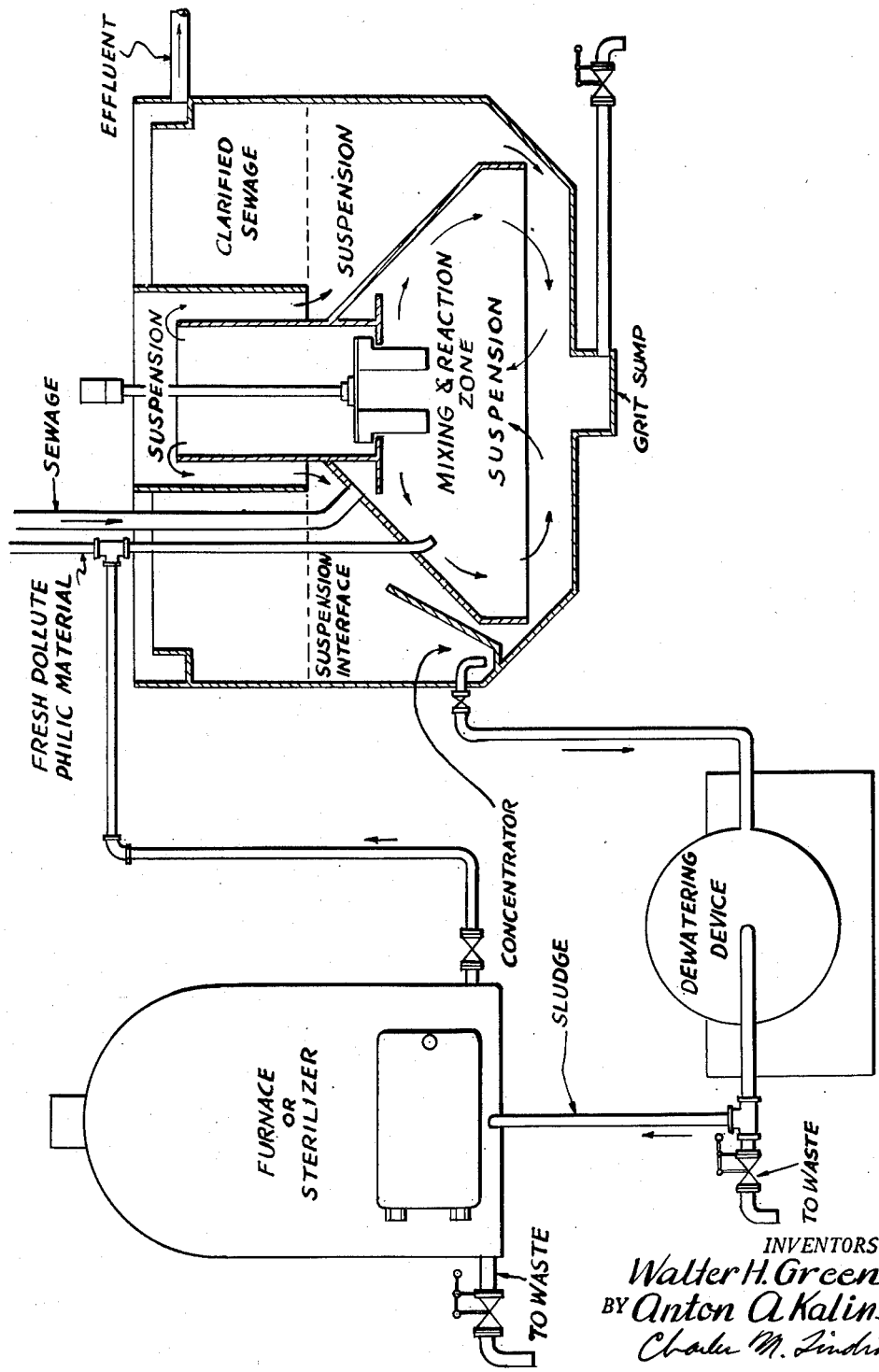

SEWAGE TREATING PROCESS

Walter H. Green, Batavia, and Anton A. Kalinske, Elmhurst, Ill., assignors to Infilco Incorporated, Chicago, Ill., a corporation of Delaware Application July 3, 1948, Serial No. 37,042

6 Claims. (Cl. 210—2)

This application relates to a process for the removal of pollute from sewage by means of a solid material which is philic to such pollute, and is a continuation-in-part of our co-pending application, Serial No. 794,962, now abandoned, filed December 31, 1947, the invention being a species of and in this sense a continuation of our co-pending application, Serial No. 773,858, filed September 13, 1947, and entitled Treatment of Oily Waste Water.

The term sewage is used herein to denote sewage of the kind usually treated in municipal treating plants, which is generally predominantly domestic sewage, but which may also contain some trade wastes.

The present invention is concerned with removing from such sewage the suspended solids, both those commonly classed as settleable solids and non-settleable, and also pollute in solution, by a method utilizing a treating material which is itself chemically inert or nearly so insofar as the immediate process is concerned, but which removes the pollute of the sewage in preference to the water content thereof (which material, for convenience, may hereafter sometimes be referred to as "pollute philic" material).

It is a primary object of the invention to provide a cheap, simple, rapid and efficient method for removing from sewage pollute in suspension and in solution.

A still further object of the invention is to provide a sewage treating process that, in its simplest form, can be carried out in a single unit or stage instead of requiring several units or steps, and which yet gives results in the way of removal of objectionable pollute and in B. O. D. reduction that compare favorably with those obtained by the usual methods involving several steps, while at the same time effecting a reduction in size and cost of the plant and its cost of operation.

Another object of the invention is to provide a sewage treatment process that is simple, that can be readily varied to give various degrees of purification as circumstances require, that is readily controlled, and that is relatively inexpensive, both as to cost of installation and operation, as compared with treatments that have been heretofore employed, while at the same time giving results equal to or better than those commonly obtained.

A further object of the invention is to provide a novel process for the treatment of sewage which utilizes a treating material obtained from the treatment itself.

Still another object of the invention is to provide a process of sewage treatment in which, or by which, one or more of the steps of such processes as are now commonly used in treating municipal sewage, may be modified or eliminated.

A further object of the invention is to provide a sewage treating process wherein the sludge formed during treatment is relatively inoffensive.

A still further object of the invention is to provide such a process in which the sludge obtained from treatment in a single unitary structure is readily dewatered, the dewatered sludge being suitable for use as fertilizer and its value as fertilizer being enhanced by the presence of the treating material used.

Raw sewage contains a considerable amount of organic polluting matter of putrescible nature which has to be removed or changed to an innocuous form before it is permissible to discharge the sewage into a water course or otherwise dispose of it. The organic matter is partly in solution and partly in solid form and there is also present in suspension some mineral matter. Usually raw sewage entering a treating plant is first submitted to a treatment for the removal of larger pieces carried along therein such as pieces of wood, rags, and the like. This is usually done by screening. The sewage is then commonly passed through what is known as a grit chamber for the removal of smaller and heavier non-organic particles, such as sand, bits of metal, etc. Following these steps the sewage is then commonly passed into a sedimentation basin for deposit of settleable solids. Sometimes a coagulating chemical, such as hydrated lime, iron sulphate, etc., is applied to the sewage prior to this sedimentation step. Due to the nature of the sewage solids entering such sedimentation basin, all of which are quite light and some of which are very fine and even in colloidal or semi-colloidal form, clarification is slow and incomplete. Because of the putrescent nature of the sewage pollute, a long period for sedimentation is not permissible and consequently only a portion, usually about half, of the suspended solids deposit. To effect further purification of the remaining solids and the dissolved pollute, additional purification steps commonly including a biological step are used. A common measure of the pollute in sewage is that known as the B. O. D. and this is ordinarily reduced only by about 35% by the sedimentation step, or something more than this if coagulation is used.

As noted above, and to improve the removal of sewage solids, both with regard to the time required and the quantity of solids removed, the sewage is sometimes treated with materials that have a chemical and coagulating action, such as calcined lime, salts of iron, or alum, etc., prior to settling. By such means more readily settleable flocs containing more of the suspended solids are formed. These coagulating treatments are relatively expensive because of the considerable quantity of coagulating material required to effect any great improvement, and the cost of the needed tanks and other equipment for applying them, and may be objectionable because of the effect on the sludge obtained by sedimentation.

It will be noted, also, that in the ordinary treating process in which no coagulating chemical is used prior to sedimentation, some of the lighter matter in the sewage, and particularly oil or grease, rises to the surface of the liquid in the settling or clarifying chamber and must be removed therefrom.

We have found that by treating sewage in the manner and with a material as described below we can in the primary clarification step remove therefrom a much higher percentage of the pollute, including both settleable and so-called non-settleable suspended solids and a portion of the dissolved organic matter together with materials that commonly rise and form a scum on the surface of the liquid, and produce an effluent that is clear and that has a B. O. D. that compares favorably with that obtained by processes that include a biological step. We obtain this result by a process that can be carried out in one stage in a single treating unit, which unit can be smaller in size than the settlers or clarifiers heretofore used and which, due to the shorter detention time required, reduces the danger of the sewage becoming septic. We have found that we can dispense with the usual grit chamber and separate the grit, the organic pollute and the liquid in our treating unit.

The treating material which we use in our process ordinarily is quite inexpensive. At the same time we secure a sludge which dewaters readily, as by filtration, and leaves a filter cake which is stable and inoffensive so that it can be disposed of easily and inexpensively. In the ordinary sewage treating plant, sludge that settles in the primary clarifier is quite voluminous, very putrescent and of such a nature that it does not filter readily. It can be made more filterable if considerable quantities of coagulant are added either to the raw sewage or to the sludge itself after it has deposited. Sulphate or chloride of iron is frequently employed for this purpose. This, however, while improving filterability, does not materially lessen the putrescent nature of the sludge. One of the problems of the ordinary sewage treatment process is the disposal of this sludge. In a few cases it can be buried or lagooned, but in the majority of cases it is passed to a digestion stage in which it is retained for a considerable period, such as 60 days or more, in a tank where it undergoes anaerobic digestion. Such digestion may result in a highly polluted liquid which is ordinarily returned from the upper part of the digester tank into the sewage treating process just ahead of the primary settling tank. It also results in a quite stable and relatively inoffensive residue or humus, which is discharged from the bottom of the tank on to drying beds where it slowly drains and dries, requiring comparatively large beds.

One advantage of our process is that such digestion step and digester are unnecessary, although if desired digestion can be employed. The sludge from our process is, however, normally quite stable and inoffensive and since it can be had from a filter in the form of a quite dry cake it is readily disposed of, as will be referred to later.

As referred to above, it is known to treat sewage prior to the initial clarification step with some coagulant to promote and increase clarification. The materials commonly used for this purpose are the salts of iron or aluminum and also quick or hydrated lime, frequently spoken of as calcined lime. The lime and other coagulant are also sometimes used together. Sometimes there has been added another material such as bentonite or fuller's earth which, while not a coagulating reagent in the sense of the salts of iron and aluminum, in that it does not involve a major chemical effect, nevertheless may have some coagulating effect and also may act as weighting agent, and in some cases may adsorb an amount of dissolved pollute. All such reagents, both the active chemical coagulants such as lime and the metallic salts and those that act as weighting agents, have been added to the raw sewage which was then stirred for a shorter or longer period, to effect thorough mixing and some degree of flocculation and then allowed to settle out as part of the sludge. Thus, these reagents of whatever kind, as commonly used, do not have a prolonged or continued cumulative effect.

In our co-pending application, Serial No. 773,858, we have disclosed a process in which there is used a solid treating material, this being applied and utilized in a new and improved manner, and this present application is a continuation and species of that generic invention. We have found that if treatment of sewage is carried out with a solid treating material as described in that application, a very high degree of purification can be obtained. The solid material that we have so far found most suitable is finely divided calcium carbonate which may be obtained either by grinding limestone, the limestone need not be pure calcium carbonate but may contain other substances such as magnesium carbonate, or it may, in some cases very desirably, be the sludge from a water softening plant. Other materials, such as some clays or fuller's earth, may be used but not so advantageously.

The materials so far mentioned are of mineral nature but they need not be mineral but may be of other origin, such as vegetable, the important thing being that they or it will fix the pollute and that clarified treated sewage will separate readily from the pollute. In addition any material used should be sufficiently stable as not to decompose or disintegrate during use. One such material we have in mind is the humus from a digester, which contains both vegetable and mineral matter. Depending on such things as the operation of the particular digester from which it comes and whether it has been dried or not, it may be desirable to wash and/or grind the humus before use. Materials of vegetable origin or containing stable vegetable matter have some advantage when the sludge from our process is to be digested.

It is impossible to state exactly the amount of treating material required to be added as this will depend somewhat upon the particular material used, but generally the amount required is, in parts per million, of the order of the amount of suspended solids in the sewage, or of the B. O. D. thereof. Such amounts are about the same as the quantities of bentonite or other such materials as have heretofore sometimes been applied in the treatment of sewage as referred to above, but due to the manner in which we use them the results we obtain are very much better.

As has been mentioned before, the reagents or materials heretofore employed have been merely mixed with the sewage or other waste and stirred therewith for a period, after which sedimentation took place and the settled solids including the pollute and the reagent were discharged to waste. In some cases some of this settled sludge or parts extracted therefrom have been returned to the process for reuse. Nevertheless, the process has been the ordinary one of mixing and coagulation with or without the use of a weighting reagent, and sedimentation, the treating reagent, while in the treating step, being applied to and mixed with and passing along with and coming in contact with only a single portion or volume of throughput.

In contrast with this, and as referred to in the prior application spoken of, we retain the solid treating material in suspension within the active treating zone for a relatively prolonged period many times longer than the period of retention of the sewage therein, during which period successive portions of the sewage enter this treating zone commonly as a continuous flow, and are acted upon by the treating material therein, and from which zone the treated sewage emerges. Thus in some cases solid pollute philic material may be retained in suspension in the treating zone for a period of several hours during which it will take part in the treatment of a very considerable quantity of sewage passing therethrough.

During this period a quantity of pollute, both that in suspension and also some in solution, becomes attached to, or is adsorbed by, or otherwise fixed by or to the particles of solid pollute philic material. At the same time there is being continuously, or in effect continuously, fed into this treating zone additional solid treating material to maintain the quantity thereof in the treating zone and there is normally being continuously, or in effect continuously, withdrawn spent treating material at a corresponding rate. Thus there is continuously maintained in the treating zone an appropriate quantity of the treating material through which there is passed a continuous, or in effect continuous, flow of sewage and from which there is withdrawn for disposal spent treating material carrying pollute with it.

As will become apparent as this specification proceeds, the quantity of pollute philic material in suspension in the treating zone is in excess, that is, greatly in excess, of the quantity of such material required to be supplied for treating the volume of sewage that is at any one time within the treating zone. Thus, each unit of sewage in passing for treatment through this zone is contacted with far more of the treating material than is added per unit of volume of sewage treated. In other words, there is maintained a concentration of the treating material within the treating zone.

Thus, let it be assumed for illustration that 200 p. p. m. (parts per million) by weight of pollute philic material is employed for treatment of a certain sewage, the concentration of solids maintained in suspension in the treating zone will normally run at least 1,000 p. p. m. and may be as high as 10,000 p. p. m. in which case each unit volume of sewage passing for treatment through this zone will come in contact with from 5 to 50 times the quantity of treating material that is added per unit volume. In some cases good results can be had with 3 or 4 times the quantity of treating material added, although the concentration is usually much higher than this and many times may go as high as 50 times the treating material added. This is one of the important features of our invention or discovery and enables the securing of a higher degree of purification with the use of a lesser quantity of treating material.

The particle size of the treating material may vary considerably within certain limits. Particles which are too large, however, are undesirable because they are difficult to hold in suspension without applying so much energy that damage may result in the way of the hindering of adherence or fixing of pollute or the building up of larger aggregates of pollute and particles. On the other hand, with extremely fine particles we have found that while the capacity for the removal of pollute is satisfactory the filterability of the sludge is less than with a somewhat coarser material. As an example of a satisfactory size we have found that particles of the sizes such as are found in the calcium carbonate sludge from a water softening plant give very good results, and we have actually used such sludge as well as calcium carbonate from a stone quarry reduced to about the same size. It is not necessary to have a sharp screening of particles to a particular size, but they can extend within the range mentioned and in some cases at least somewhat outside of this range.

A preferred pollute philic material is calcium carbonate used in the form of ground limestone, or as found in softener sludge. This need not be pure calcium carbonate but may contain or, in some cases, even largely consist of magnesium compounds. Other materials of corresponding physical characteristics may be used, such as diatomaceous earth, fuller's earth, bauxite, or some of the clays—the material preferably being of the non-swelling type.

While it is preferred to use non-swelling materials we have used some swelling materials and have had satisfactory results so far as pollute removal was concerned. The sludge obtained with such swelling materials is definitely not as easy to filter as that obtained by using calcium carbonate, and when such materials are used it is ordinarily necessary to use therewith an amount of a coagulant such as alum in order to get satisfactory clarification.

The use of calcium carbonate in the form of water softening sludge has the advantage that the material is sometimes available practically free of cost and, in fact, in some cases provides a ready means of disposal of such softener sludge where otherwise some difficulty in disposal may be involved. We have also found that for some reason not yet entirely known to us, when fine calcium carbonate, either water softener sludge or from some other source, is used as treating material the tendency of the sewage sludge to rapidly become septic is very greatly reduced yet it can be digested in the ordinary digester, if the proportion of calcium carbonate is not too great.

As noted above, it is not unknown to mix materials such as we propose to use with sewage, with or without a period of stirring, and then allow the mixture to settle. We have found, however, that it is not possible to so obtain results comparable with those of our process unless a far greater quantity of treating reagent is used, many times more. This, of course, involves increased cost of treatment, also difficulty in handling the treatment, a larger quantity of the sludge to dispose of and, in many cases, not equivalent results. To illustrate, comparative tests were made in one place where the same quantity of slude from a water softening plant was used in treating the sewage in different ways. If this sewage were simply settled, as is ordinarily done in a sewage clarifier and for the same period of time, the B. O. D. reduction obtained was from 30 to 35% with a reduction of suspended solids of 45 to 50%. If softener sludge were mixed with this sewage and the mixture agitated for 25 to 35 minutes and then settled, the B. O. D. reduction increased to from 40 to 50% and the suspended solids removal to 50 to 60%. When the same sewage was treated with the same amount of softener solids according to our process and no coagulant or other treating reagent used, the reduction in B. O. D. was about 70% and of suspended solids about 75%. If, in addition to the treatment with the softener sludge, there was added a very small amount of alum, that is, from ½ to 1 grain per gallon, the reduction in suspended solids was 95% or more and the B. O. D. reduction increased to over 80%. The effect of the small amount of alum added was to coagulate and remove some of the very fine particles which otherwise went over with the effluent.

We also made tests using such coagulants as alum and iron sulphate and also at times have used activated silica with these, but were not able to get as good results with these as we obtained with the solid pollute philic material used as described even when using quite large doses of the coagulant—amounts which would be objectionable from the cost standpoint. We also did not succeed in getting as good B. O. D. reduction and the sludge, of course, was objectionably slimy and difficult to filter.

As noted above, there is a very considerable accumulation of the solid treating material within the treating zone, this being in the form of a suspension comprising the treating solid and sewage undergoing treatment, and containing a quantity of treating solid many times greater per unit volume than the quantity of solid added per unit volume of sewage treated. The volume of the treating zone may be varied somewhat depending upon the character of the sewage being treated, the particular form of apparatus, the particular treating material used, etc. We have found, however, that when the apparatus is in the preferred form as described herein the volume of the treating zone may well be such that retention of the sewage in the treating zone may be of the order of about 15 minutes, and the total time of retention in the full apparatus of the order of one hour or less, in some cases as little as 30 minutes. We are not aware of any apparatus or process heretofore proposed in which an equal degree of purification can be obtained within such limits of time or cost.

We are not able at this time, to say in just what manner the purification obtained is effected by the material used. It is not clear to us yet whether the process is in the nature of a surface action, such as adsorption of pollute by the particles or adhesion of pollute to the particles a combination of both of these, or some other phenomena not known to us, but at any rate the pollute becomes fixed, so to speak, so as to be readily separable from the liquor. Therefore, when speaking herein of adsorption we do not wish to limit ourselves to any theory of the process but use this term only for the sake of convenience. However, from our tests it is clear that a mere addition of these materials to sewage with ordinary mixing thereof in the sewage does not result in purification of the degree we obtain. We think that the excellent purification we have obtained is at least in part and to a great degree a result of the use of the treating materials as a thick suspension in the sewage undergoing treatment in the treating zone, whereby there is offered to the sewage undergoing treatment an enormous surface area of the treating material with something in the nature of a mass effect.

The apparatus used for carrying out our process should be of a type which is able to maintain a suspension of the type referred to in the treating zone and to circulate in and through this zone the throughput quantity of sewage, the treated sewage from this zone escaping in clarified form from a horizontal interface. This permits carrying out complete treatment as so far referred to, including the separation of clarified sewage from the suspension in a single relatively small tank and in one step or stage. From our experience thus far the apparatus known to the trade as "Accelator" is the most advantageous and has been diagrammatically shown in the drawing.

As noted above it is possible when using our process to omit the grit chamber that is a part of most sewage treating plants. The purpose of such a grit chamber is to remove heavier particles such as cinders, sand, etc., before the sewage enters the primary clarifier and so to prevent their deposit there with the slude deposited during sedimentation. Their presence in the sludge is objectionable because of their additional weight and bulk and it is undesirable to pass them on into the digester since they are stable and indigestible and merely burden the digester. We have found that when our process is carried out as described and particularly so when in an apparatus as shown in the drawing, then heavier and inert grit particles will deposit on the floor and be swept into the sump, whence they are readily discharged through the pipe shown, while the lighter and properly retained particles are held for a time in suspension by the agitation and circulation and finally become part of the sludge referred to. We are thus able to combine these two heretofore separate steps and carry them out simultaneously in one apparatus instead of as heretofore at separate times and in separate pieces of equipment, that is, in addition to the other effects referred to we obtain a classification effect as to heavier and lighter particles.

Our invention will be more fully understood by reference to the accompanying drawing in which is illustrated a representation of one form of apparatus for carrying out the process of our invention in its simplest form, there being also shown some auxiliary apparatus that may be used in carrying out the process.

The apparatus, as shown in the drawing, comprises a treating apparatus of a well known construction, sold under the trade name "Accelator." It will be understood, however, that this apparatus is shown only as a preferred form of apparatus suitable for carrying out our process, and that other apparatus can be used so long as they are adapted to maintain the conditions set forth, such as for instance, the thick circulating suspension and the passage of sewage therethrough. In this figure the apparatus known as "Accelator" is shown at the right hand side of the figure. Since this apparatus and its operation are well known, it is unnecessary to go into a detailed description of its construction and operation, and this particular form of apparatus shown as being used to carry out our process of treating sewage will readily be understood from the drawing and the preceding references to the process.

In carrying out our process in the apparatus shown, the raw sewage to be treated is introduced into a large volume of a rather thick suspension of pollute philic material in sewage undergoing treatment, which has been added to and accumulated from previously treated sewage. This suspension, the volume of which should be many times the volume of the incoming sewage, is maintained in the mixing and reaction zone in the lower part of the apparatus and is continuously circulated throughout this mixing and reaction zone, preferably by the circulator or agitator and pump shown. Incoming sewage is mixed with, and incorporated in, the suspension in the mixing and reaction zone, and the mixture is agitated sufficiently to prevent sedimentation of particles from the suspension, and to provide the circulation desired. Sewage is retained in the suspension for a period sufficient to provide for the desired degree of purification and treated sewage separates from the suspension at the sewage suspension interface and is withdrawn to waste. As indicated in the drawing, fresh pollute philic solid treating material is added to the suspension in the mixing and reaction zone, although it may be added directly to the incoming sewage if desired and spent treating material carrying pollute therewith is withdrawn from the concentrator shown, preferably at the rate fresh pollute philic material is added thereto. The amount of treating material added will vary with the different materials used, the amount of pollute in the sewage and the degree of purification desired, but in most cases should roughly approximate the amount of solids in the incoming sewage.

We have also shown in this drawing certain additional or auxiliary apparatus useful in carrying out certain additional contemplated steps of our process. Thus we have indicated the sludge discharged from the apparatus as going to a dewatering device, herein shown as being a filter. Said filter may be any of the ordinary types of filters used for filtering such sludge but preferably is a rotary vacuum type filter. However, any other suitable form of filter or dewatering device may be used. This filter is merely indicated diagrammatically and as shown the sludge from the filter is marked as going to a furnace or sterilizer. The liquid discharged from this filter, which will ordinarily be quite highly purified sewage, may be sent to waste with the effluent from the treating unit or, if desired, it may be returned to the treating unit to pass again therethrough with the raw sewage.

The sludge from the filter may be disposed of as is found convenient in each case. Since it is comparatively dry and readily handled it may be hauled and dumped in some suitable place. If this means of disposal is not available it may be passed to the furnace indicated and there either be more completely dried or burned sufficiently to char the organic matter. In some cases, as for instance when there is a scarcity of suitable treating material, the burnt or charred residue from this furnace may, either with or without grinding, be used as treating material. It will be understood, however, that when this is done the heating should preferably not be sufficient to calcine the lime so as to change it to calcium oxide. Instead of the sludge from the filter going to the furnace, it may be sterilized. This sterilization is not necessarily for the purpose of bacterial sterilization, but instead may be for the purpose of killing weed seeds so that this waste, which contains a very considerable proportion of organic matter, may be used for fertilizer.

It should here be understood that in some cases, where it is desired or necessary to get additional purification of the sewage, the purification may be carried through additional steps beyond that shown in the drawing and described in connection therewith. Thus, in some cases it will be found desirable to pass the effluent from the "Accelator" through some biological treatment, as, for instance, a trickling filter or an activated sludge oxidation tank. In such cases the effluent from such treatment will contain an amount of suspended matter formed as a result of such treatment and it may become necessary to again clarify the effluent. Normally, this is accomplished by passing the effluent from the biological or other such treatment through a settling tank which may be one of the conventional type clarifiers, or it may, in many cases, very advantageously be another apparatus such as an "Accelator" like that used in the first step. Where a second "Accelator" is used, the treatment therein can be like that in the first step, that is, a solid reagent may be used and maintained in suspension in the sewage undergoing treatment. This is particularly desirable if the sludge from the secondary clarifier is to be filtered or otherwise disposed of. The clarified effluent from the second clarifier or "Accelator" will go to waste, as usual.

It may be seen from the foregoing that we have invented and discovered a simple and inexpensive, but highly efficient process for the purification of sewage wherein the pollute in suspension and, to a substantial degree, dissolved pollute is fixed and the clarified sewage is readily separated from the pollute in a single treating unit by the use of an inexpensive treating material, which may be a material which would otherwise be wasted, without using the several treating apparatus and steps heretofore used for obtaining similar results.

We claim:

1. The process of treating sewage which comprises maintaining a suspension of calcium carbonate in sewage undergoing treatment, continuously adding incoming sewage to be treated to said suspension, thereby displacing treated sewage therefrom, and simultaneously adding to said suspension a quantity of calcium carbonate about equal to the B. O. D. of the incoming sewage, applying mechanical agitation to said suspension to mix the newly entering sewage and calcium carbonate therewith, retaining and accumulating in said suspension calcium carbonate left behind by the sewage displaced therefrom and thereby attaining therein a concentration of calcium carbonate per unit volume of sewage being treated many times greater than the quantity of calcium carbonate added per unit volume of incoming sewage, and withdrawing to waste from said suspension spent calcium carbonate with fixed pollute.

2. A method of removing pollute from sewage comprising continuously introducing sewage to be treated into a mixing zone filled with a suspension of solid particles of calcium carbonate, continuously adding a quantity of fresh particles of calcium carbonate to said suspension about equal to the amount of suspended solids in the entering sewage, agitating said suspension to effect mixing of said entering sewage and fresh particles of calcium carbonate with said suspension and to establish a circulation of said suspension within said mixing zone, continuously withdrawing treated sewage from said suspension, retaining the particles of calcium carbonate separated from said treated sewage in said suspension for a period in excess of the retention period of the sewage, and withdrawing pollute contaminated particles of calcium carbonate from said suspension.

3. The process of claim 2 comprising the additional step of carbonizing withdrawn calcium carbonate at a temperature below that at which calcining occurs, and utilizing the carbonized particles as the treating material in the process.

4. The process of treating sewage for the fixing and removal of putrescible pollute therefrom by particles of calcium carbonate, wherein sewage to be treated and fresh calcium carbonate are continuously introduced into a treating zone and mixed therein and a corresponding amount of treated sewage is displaced therefrom, characterized by retaining and accumulating in suspension in said treating zone particles of calcium carbonate separated from said displaced sewage and thereby attaining a concentration of calcium carbonate within said treating zone by which each unit volume of sewage under treatment will come in contact with a quantity of calcium carbonate from about 3 to about 50 times the quantity of suspended solids contained in such unit volume of incoming sewage, imparting energy to said suspension of calcium carbonate in addition to any energy imparted thereto by the newly entering sewage to hold said suspension against sedimentation, and continuously separating and removing pollute laden particles of calcium carbonate from said suspension.

5. A sewage treating process comprising the steps of maintaining in a mixing zone a suspension of water softening sludge in sewage in the process of treatment, continuously introducing sewage to be treated and a quantity of fresh particles of water softening sludge about equal to the B. O. D. of the entering sewage into said mixing zone, applying energy in said mixing zone sufficient to mix said incoming sewage and fresh particles in and with said suspension and to establish a circulation in said mixing zone including a lower inward flow, depositing heavy inorganic material contained in entering sewage from said circulating suspension into a settling zone underlying said circulation and in unobstructed communication therewith, whereby liquid and lighter particles entrained by said heavy inorganic material may rise from said settling zone and be picked up by said circulating suspension, withdrawing treated sewage from the upper surface of said suspension, withdrawing heavy inorganic material from said settling zone, and withdrawing pollute contaminated water softening sludge from said suspension.

6. A process of removing polluting matter from waste water by treatment with calcium carbonate, comprising passing the waste water to be treated and a quantity of fresh calcium carbonate about equal to the suspended solids in the waste water to be treated into, and agitatively mixing them with, a suspension containing an accumulation of calcium carbonate retained from previously treated waste water several times the amount of calcium carbonate added to said suspension per unit of volume of waste water to be treated, withdrawing treated waste water from said suspension, and wihdrawing pollute contaminated calcium carbonate from said suspension.

WALTER H. GREEN.
ANTON A. KALINSKE.

REFERENCES CITED

The following references are of record in the file of this patent:

UNITED STATES PATENTS

| Number | Name | Date |
|---|---|---|
| 1,617,014 | Derloth | Feb. 8, 1927 |
| 1,672,584 | Travers | June 5, 1928 |
| 1,754,129 | Travers | Apr. 8, 1930 |
| 1,915,240 | Putnam | June 20, 1933 |
| 1,956,420 | Gleason et al. | Apr. 24, 1934 |
| 2,021,672 | Spaulding | Nov. 19, 1935 |
| 2,021,679 | Bevan | Nov. 19, 1935 |
| 2,072,154 | Butterfield | Mar. 2, 1937 |
| 2,128,393 | Allen | Aug. 30, 1938 |
| 2,128,569 | Velz | Aug. 30, 1938 |
| 2,261,924 | Pittman et al. | Nov. 4, 1941 |
| 2,268,726 | Tark | Jan. 6, 1942 |
| 2,294,697 | Seip | Sept. 1, 1942 |
| 2,296,523 | Henry | Sept. 22, 1942 |
| 2,348,122 | Green | May 2, 1944 |
| 2,364,023 | Green | Nov. 28, 1944 |
| 2,442,809 | Hallier et al. | June 8, 1948 |

FOREIGN PATENTS

| Number | Country | Date |
|---|---|---|
| 435,862 | Great Britain | Sept. 23, 1935 |
| 463,458 | Great Britain | of 1936 |
| 483,954 | Great Britain | of 1937 |
| 500,271 | Great Britain | Apr. 19, 1937 |

OTHER REFERENCES

Rafter et al., Sewage Disposal in U. S., pp. 565–6, Van Nostrand Co. (1894).

Keefer, Sewage Treatment Works, pp. 138–141, McGraw-Hill (1940).